(12) United States Patent
Moon

(10) Patent No.: US 11,546,170 B2
(45) Date of Patent: Jan. 3, 2023

(54) SYSTEMS AND METHODS OF COLLABORATIVE APPLICATION ON A PRIVATE NETWORK

(71) Applicant: Whitestar Communications, Inc., Apex, NC (US)

(72) Inventor: Billy Gayle Moon, Apex, NC (US)

(73) Assignee: Whitestar Communications, Inc., Apex, NC (US)

( * ) Notice: Subject to any disclaimer, the term of this patent is extended or adjusted under 35 U.S.C. 154(b) by 699 days.

(21) Appl. No.: 16/518,491

(22) Filed: Jul. 22, 2019

(65) Prior Publication Data

US 2021/0028943 A1 Jan. 28, 2021

(51) Int. Cl.
*H04L 9/32* (2006.01)
*G06F 16/23* (2019.01)
*G06F 16/11* (2019.01)

(52) U.S. Cl.
CPC .......... *H04L 9/3247* (2013.01); *G06F 16/113* (2019.01); *G06F 16/2379* (2019.01)

(58) Field of Classification Search
CPC ... H04L 9/3247; G06F 16/113; G06F 16/2379
See application file for complete search history.

(56) References Cited

U.S. PATENT DOCUMENTS

| | | | | |
|---|---|---|---|---|
| 7,356,563 | B1* | 4/2008 | Leichtling | G06Q 10/06 709/204 |
| 2003/0002521 | A1* | 1/2003 | Traversal | H04L 69/329 370/465 |
| 2004/0054885 | A1* | 3/2004 | Bartram | H04L 9/3265 709/204 |
| 2014/0040638 | A1* | 2/2014 | Barton | H04L 63/10 713/193 |
| 2014/0149512 | A1* | 5/2014 | Leitch | H04L 67/1061 709/204 |
| 2017/0185488 | A1* | 6/2017 | Kumarasamy | G06F 11/1482 |

OTHER PUBLICATIONS

Dissenter, Frequently Asked Questions at https://dissenter.com/help/faq, Apr. 16, 2017.
https://www.web2pdfconvert.com/, 2018.

(Continued)

*Primary Examiner* — William J. Goodchild
*Assistant Examiner* — Mayasa A. Shaawat
(74) *Attorney, Agent, or Firm* — Devlin Law Firm LLC; Deepali Brahmbhatt

(57) ABSTRACT

The systems and methods of enabling a collaborative application on a private network, comprising: establishing a secure and encrypted private network with a whitelist of two or more profiles using alias and digital keys; hosting an application on a computing device associated with a first profile on the whitelist; enabling the application to accept content using an application program interface, broadcasting the application with digital signature of the first profile to the profiles on the whitelist of the private network; receiving a request to send content to the application with digital signature from a second profile on the whitelist; automatically updating the content of the application after validation of the request; broadcasting the update notification to all the profiles on the whitelist of the private network.

16 Claims, 9 Drawing Sheets

(56) References Cited

OTHER PUBLICATIONS https://www.codester.com/items/13206/web2pdf-ios-source-code, 2018.
Zeroisation at https://en.wikipedia.org/wiki/Zeroisation, 2018.
IBM Az/OS Cryptographic Services, Integrated Cryptographic Service Facility, Application Programmer's Guide, p. 50, 2011.
FIPS Pub 140-2, May 25, 2001.
DIBS at https://github.com/emin63/dibs, 2014.
https://github.com/afonsocastro96/SDIS-Project2, 2016.
https://sourceforge.net/projects/p2pbackupsmile/, 2010.
http://www.infostor.com/nas/58-top-open-source-storage-project-1.html, Dec. 26, 2013.
CDN disclosed at https://en.wikipedia.org/wiki/Content_delivery_network, 2015.
BitTorrent Speed to Strengthen BitTorrent Protocol, Connect users with (BTT) tokens, McBrown, Jan. 17, 2019 at http://blog.bittorrent.com/2019/01/17/bittorrent-speed-to-strengthen-bittorrent-protocol-connect-users-with-btt-tokens/.

* cited by examiner

SYSTEMS AND METHODS OF COLLABORATIVE APPLICATION ON A PRIVATE NETWORK

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Whitestar Communications, Inc.'s concurrently filed patent applications are incorporated herein by reference: titled "SYSTEMS AND METHODS OF SALUTATION PROTOCOL TO COMMUNICATE USING A PRIVATE OVERLAY PEER TO PEER NETWORK." and U.S. patent application Ser. No. 16/518,292; titled "SYSTEMS AND METHODS OF SECURING DIGITAL CONVERSATIONS FOR ITS LIFE CYCLE AT SOURCE, DURING TRANSIT AND AT DESTINATION" and U.S. patent application Ser. No. 16/518,406; titled "SYSTEMS AND METHODS OF ENFORCING COMMUNICATIONS SEMANTICS ON A PRIVATE NETWORK"; titled "SYSTEMS AND METHODS OF GESTURE TRIGGERED AUTOMATIC ERASURE ON A PRIVATE NETWORK"; titled "SYSTEMS AND METHODS OF DISTRIBUTED BACKUP AND RECOVERY ON A PRIVATE NETWORK"; titled "SYSTEMS AND METHODS OF DELEGATION OR REPLICATION ON A PRIVATE NETWORK."

FIELD OF THE INVENTION

The present invention is in the technical field of establishing and controlling conversations in social media with the use of secure and encrypted private networks. More particularly, the present invention is in the technical field of secure communications that are encrypted at source, in transit and at destination. More particularly, the present invention is in the technical field of retaining control, edition, modification and/or deletion rights to the original author of the content.

BACKGROUND

Current social media systems are enabled by central services provided by third parties. In essence, social media is interaction between two or more end-users that mirrors real-life situation where a third-party has no business interfering. But the digital world of the internet applications of social media do not align to the real-world frameworks.

Social media typically facilitates user-generated content including text, comments, photos, videos and voice. Traditionally these various media are generated through "online" interactions and are facilitated by one or more third party platforms such as Twitter, Facebook, Youtube, SnapChat, Instagram, Weibo, LinkedIn and many others.

In traditional social media systems, users create profiles via a service providers website or app and all the content is maintained, processed and stored by the social media company. In such systems, users rely on the social media companies to store and protect their sensitive user data both while in flight, i.e. in transit and at rest, i.e. either at source or destination.

While users don't pay "directly" for use of these services, the services providers generate revenue from its user content and meta data through directed ads and selling access to their subscribers' content for data mining or harvesting. This revenue then offsets the cost of maintaining the centralized servers and data centers and in some cases returns dividends to their shareholders.

Unfortunately, there are a number of serious drawbacks to this architecture. Most notably is the broken business model that requires the service provider to monetize their customers, which in turn requires their customers to give some, if not all of their privacy.

Additionally, the service provides have recently gone into censorship or "de-platforming" of content based on their or their advertisers' best interests and not necessary the interest of their users or user communities. In some cases, the censorship is at the direction of a central government but in most cases, it is carried out based on arbitrary decisions of the social media service provides.

Complicating the matter, should a competitor wish to enter the market to compete against the entrenched social media companies it takes tremendous capital to build out the data centers and facilities to onboard even a single user. As users join the new network, more resources must be added to the central networks to manage the traffic load and to store the content being created by their users. At the end of the day, the new social media company would once again have to monetize their customer base, solicit advertisers and adhere to government oversight. While the new company might impose a different set of censorship policies than the legacy companies its still censorship by a third party and not by end users.

Further, social media companies typically deploy simply one-way authentication and HTTPS to secure their user's data in flight. Many enterprise networks (as well as others) are able to put a "man in the middle" of such traffic using an HTTPS proxy, thus exposing all data in flight to the intermediary and allowing that intermediary to filter, read, copy and save user content without them being aware of it.

One-way authentication only authenticates or assures the user that when they connect to a sight that "claims to be" say instagram, that in fact it is instagram. The converse is not true. The cryptographic system does not authenticate the client software used by the user and therefore must trust higher level protocols to assure that a user that claims to be user A is in fact user A, for example through passwords or other means.

Both sets of "keys", the ones that attest to the service provider's identity and the passwords used by the "user" are not changed very often, and can actually not change for years. This means that if either key is broken, that all the user's or even sights' data can be exposed. Breaking the keys to access a sights meta data can expose all data of every user in the system. Breaking a given user's key can expose all of a user's stored content.

In summary, the current architecture of social media tends to lead to: (i) Third party censorship, sometimes legally, sometimes not; (ii) Lack of Privacy either on purpose or by accidental exposure; and (iii) Lack of free association.

The last point, lack of free association can best be understood by the fact that the social media companies can and do decide what user can and can not participate in their platform. Worse is that while excluding one user A from freely joining a given community and conversing with members of that community, the same platform may allow other members to make almost any claim about user A without allowing user A the ability to refute those claims. This leads to very bad social norms in which gangs of denizens roam from social media site to social media site spreading false or unsubstantiated claims about user A without user A being able to defend herself on any of those platforms.

Furthermore, because the user's content is held by a third party and the social media companies routinely change their terms of services, most users are unaware that their content may be retained or archived, indefinite. A frivolous statement which is deemed "social acceptable today" may be judged years into the future by a new set of standards and lead to harsh consequences including ability to get into schools and colleges, ability to get a job, ability to run for public office, etc. We call this effect "Future Guilt."

Still further problems exist in the semantics of existing social interactions on social media sites. When someone creates content, they don't "own" that content, the social media company does. Even with as simple as email, "ownership" of content is fluid and the semantics of "polite" conversation are not a part of the system.

For example, if user A creates an email message and sends it to user B and in that email, user A included content that she did not want to disclose to anyone else, there is nothing in the art that would prevent user B from saving that information away, copying it or forwarding it to someone else like user C. Neither is user B prevented from replying to user A and copying additional users D, E, etc. on that reply. This sort of "lack of control" of content is pervasive in today's social media systems and this leads to a lack of polite discourse amongst members of society.

With the explosion of Internet of Things (IoT) devices, the number of devices connecting on the internet are exploding. It is unreasonable to expect any single device, for example, to have equal probability of connecting with another IoT device next to it or a personal computer remotely located in Mongolia. The current internet and networked communication do not align to the way society or human behavior operates. There are no digital equivalents that promotes good behavior in a digital or online environment that are cultivated based on existing social norms.

The current public networks assume uniform packet distribution that cannot be converged. Security is also an issue because any computing device can send a packet to any other device. The approaches to resolve digital spam including email or text spam are based on prevention and not fixing the root cause of the problem, i.e. openness of receiving packets from unauthenticated senders.

In an attempt to solve the above problems, GAB, an alternative social media company, recently launched a service called "dissenter" in attempt to address at least some of the problems mentioned above, specifically the right to comment on content on a site that one has been banned from participation in. It is embodied as an extension to a web browser: gab.com/GabDissenter. Dissenter allows users to "comment on" content that is being displayed within a browser. However, this service is still a cloud based service, the content is still controlled by GAB and it is still potentially subject to GAB's terms of service, leading to just an alternative set of censorship rules.

Another attempt in allowing free commenting and annotations includes, for example, converters at web2pdfconvert and condester.com web2pdf-ios-source-code. These products allow one to take any content visible on a web site, including social media sites which have web interfaces and then convert the content of that web site into a PDF document that can be stored, transferred and annotated with comments. In general, such actions are not consistent with "fair use" laws as they include more than 50% of the original content without modification. Furthermore, these products don't directly support collaborative discussions about the content, do not store the content safely, do not send the content safely and may allow comments from others to be re-distributed by anyone receiving the document.

SUMMARY OF THE INVENTION

The present invention is systems and methods of enabling a collaborative application on a private network, comprising: establishing a secure and encrypted private network with a whitelist of two or more profiles using alias and digital keys; hosting an application on a computing device associated with a first profile on the whitelist; enabling the application to accept content using an application program interface, broadcasting the application with digital signature of the first profile to the profiles on the whitelist of the private network; receiving a request to send content to the application with digital signature from a second profile on the whitelist; automatically updating the content of the application after validation of the request; broadcasting the update notification to all the profiles on the whitelist of the private network.

The systems and methods of enabling a collaborative application on a private network, wherein the application is one or more of the following: a webserver, a webserver linking to a webpage external to the private network, a webserver with transcluded information from a webpage external to the private network, a plug-in installed on a browser, a mobile application, an ftp server, a document repository, database, an email server, or a social media blog.

The systems and methods of enabling a collaborative application on a private network, wherein the application accepts comments as content on a published source that are dynamically annotated digitally on the source or in a side panel.

The systems and methods of enabling a collaborative application on a private network, further comprising: broadcasting the update notification to the profiles on the whitelist based on selective preferences of one or more of the following: time-based frequency, geographic proximity, source of an update.

The systems and methods of enabling a collaborative application on a private network, wherein the first profile computing device hosting the application has control to delete, modify or revise the application or any of the received content from all the devices on the private network.

The systems and methods of enabling a collaborative application on a private network, wherein private network accepts requests from the second profile computing device to delete, modify or revise the content sent to the first profile by itself from all the devices on the private network; and rejects requests to delete, modify or revise the application or content sent by another profile.

The systems and methods of enabling a collaborative application on a private network, further comprising: preventing anonymous content on the private network.

The systems and methods of enabling a collaborative application on a private network, further comprising: archiving portions of or all of the application and associated content based on time snapshots.

The systems and methods of enabling a collaborative application on a private network, further comprising: reverting back to the application state for one or more profiles based on one or more of the following: a given time snapshot, exclusively for updates from a source, selectively displaying or hiding portions of updates based on profile preference.

The systems and methods of enabling a collaborative application on a private network, further comprising: adding profiles on the whitelist for permanent access, transient based on geographic proximity, transient based on a time period, or transient based on the type of the application.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
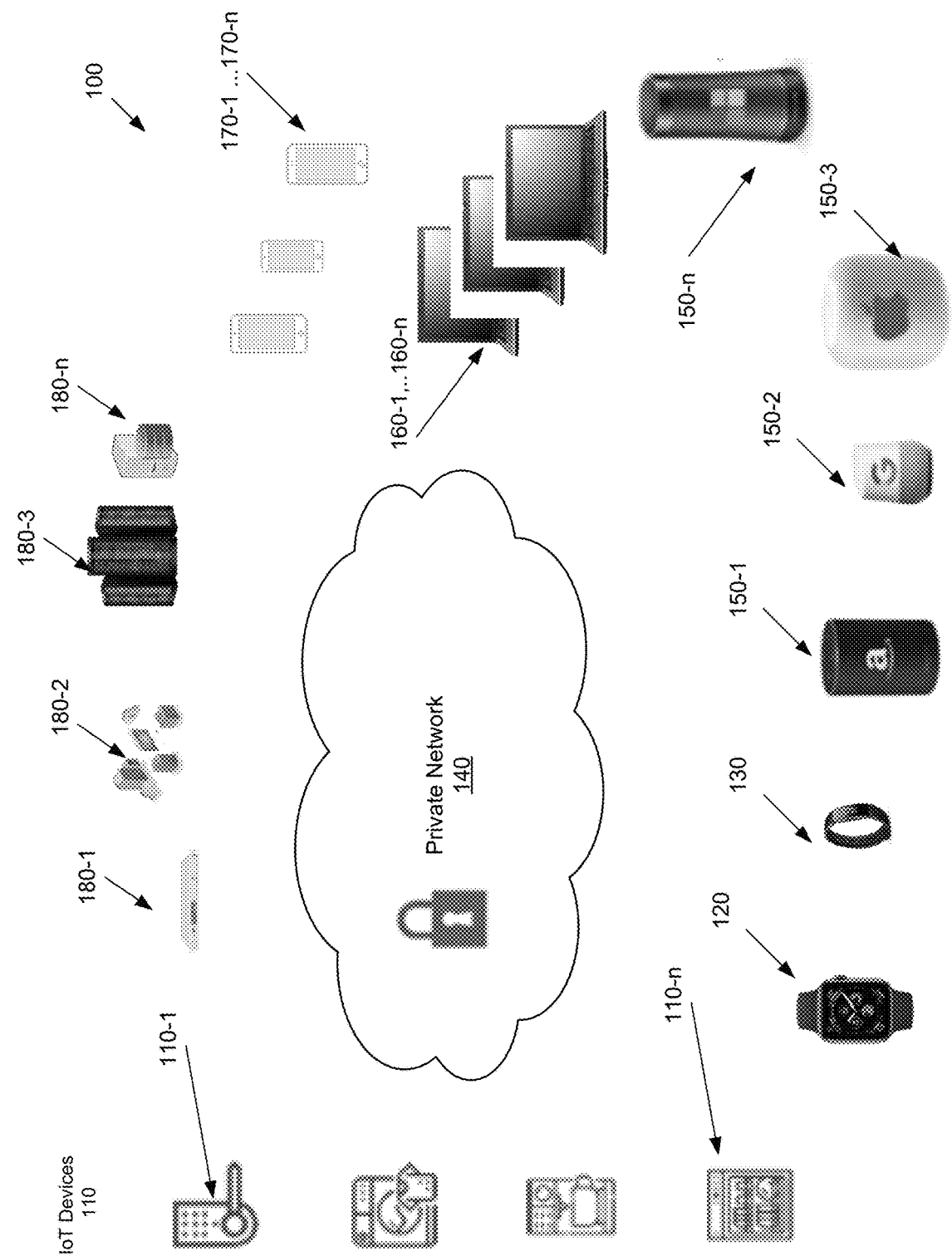
FIG. 1 shows a diagram illustrating an example of systems and methods of enabling a collaborative application on a private network with different types and categories of computing devices including internet of things devices.

The systems and methods of enabling a collaborative application on a private network includes techniques to securely publish an application that receives and responds to collaborative content from one or more users. The application is automatically updated and the originator or source of the content continues to have control on the publication of the content. Readers of the content can customize preferences to receive selective notifications or can mute a broadcast. Depending on the type of application, the private network automatically gives priority to dissemination of its content. For example, a live video streaming gets higher priority in broadcasting than publication of offline documents.

The systems and methods of securing digital conversations for its life cycle provides for a completely distributed social media platform that allows both humans and machines to freely associate with one another assuming a trusted relationship with a secure channel is already established between the parties exchanging the information. In this platform, there is no central service. There is no cost to stand up the platform. There are no additional costs as each new user joins the social network. Instead of a central services storing user content and facilitating user content distribution and subsequent storing or recording, all these facilities are provided in a peer to peer social network by the users themselves.

No central authority can prevent the users from freely associating with one another or can exclude a given user from participation in social media with this system.

The systems and methods of enabling a collaborative application on a private network, discloses a novel means by which existing or legacy content on existing cloud based social media sites, including but not limited to search results, forums, facebook, twitter, instagram, etc. can be referenced and commented on by groups of individuals that choose to freely associate with one another and choose to share their comments on said external content.

The advantage of this system is that the "commentary" is not stored on a centralized server, rather it is owned by each commenter, and the content is only shared amongst users that choose to freely associate to discuss the external content in question. This difference makes our system superior in protecting a user's rights to free association and freedom of speech without intervention by third parties.

With the private network, data flows encapsulated within secure objects. Secure objects include endpoint, conversation and message objects. These objects transmit and receive messages and contents from applications using an automated application programming interface.

In one embodiment, the application is content that can be viewed by a web browser. The content can then be discussed by a group of free associating endpoints. This can be applied to any content that may be viewed by the users via a standard web browser. In one embodiment, content is annotated using transclusion. For example, a "conversation" can be created to discuss a particular web page that has been published at some URL on the internet. The conversation object's binary "content" field would be used to perhaps provide a topic and then a transclusion of the content to be discussed. A given endpoint must first create this topic and then subsequently add other endpoints to be included in the discussion of the content. Each party (endpoint) is then sent a copy of the newly created conversation object.

At this point, any participant of the conversation may create a "message" object with content that provides commentary on the original content of the conversation or even transclude or reference other messages in the same conversation.

In this system, the conversation and all subsequent messages are shared and held within the endpoint's participating in the discussion. All content is therefore owned by its creator, can be amended or even deleted at any time. Should a member of the conversation wish to withdraw from the conversation, then all messages sent by that user would be subsequent removed from the devices of all other members of that conversation. Additionally, should the creator of the conversation delete the conversation itself, then all messages within that conversation would subsequently be deleted as well. Furthermore, any reply (message) added to the conversation could also transclude additional content to bring further understanding or relevance to the conversation.

In one embodiment, the features as described above are essentially the same. What's different is that rather than hosting the transcluded information within the private network application, apart from the browser as discussed earlier, in this embodiment, the content is hosted in the private network application within the browsers as a browser plug-in. Browser plug-in's are a standard capability on both desktop and mobile browsers and it is know in the art how to implement such plug-ins. In this case, we'd provide the identical functionality as described in the first embodiment, it's just that everything would run within the browser application rather than a stand alone application. This would make the "appearance" of the application very similar to how many web pages appear, with of course the totally different implementation.

In one embodiment, rather than using "transclusion" to reference the external content that is being commented on, we can "include" all or part of the original content within the conversation or message object's binary content field. This technique has the "advantage" of making the original content "durable" and it also hides the fact that other members (endpoints) participating in the conversation are seeing the content. With transclusion, each participant must fetch her own copy of the original content whereas in this case the content is only fetched by the creator of the conversation and then it is forwarded to other members of the conversation.

The content being "included" can be either captured in textual form such as creating a PDF document or a "hear now" HTML document or it can be the result of a screen capture of the content and therefore be included as a binary image or sequence of images. Further, the content may contain all or part of any related audio.

In one embodiment, the private network hosts an application used in music streaming with digital rights management. In one embodiment, the private network hosts a ticketing application for concerts. In one embodiment, the private network hosts a coupon-based system that is triggered based on time or location proximity.

The private network application publishes a conversation topic with initial content that is annotated using messaging objects from different users on a whitelist of the publishing private network. The original content can be accessed digitally at any time. Different incremental versions with annotations and comments are saved based on user commenting as well as time based snapshots. For example, a person of ordinary skill in the art would understand that this system could be used to republish books with comments and annotations from celebrities, mathematicians or scientists. People may be interested in buying a book with Bill Gates comments and annotations. Bill Gates as an originator of his own comments would be able to retain control over his comments and can retract or modify any of his comments at any given time from all of the recipients.

In another example, the application is published on a private network that is accessible to all. For example, a public forum on knives. If user B bad mouths a User A who notices that comment. He wants to join the Forum to refute that. The application hosting described herein allows user A to post his comments independent of any third party.

In another example, a user wants to put an item for sale on Craiglist or trade shows. He can publish that item using the private network setup that allows authenticated access to everyone. Anonymous commenting and bad behavior is fixed. When a comment can be tracked to a person, digital use and public commenting is cleaner. The private network allows transient relationships based on time-based tradeshows, pop ups, conferences, or concerts. Equivalent to what occurs in real life, these transient relationships can later be converted to permanent relationship, once enough trust is established.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of securely connecting computing devices through the private network as well as storing information securely on the computing devices before or after each transmission. In the example of FIG. 1, the environment includes a first IoT devices 110-1 through an nth client system 110-$n$, private network 140, a smart watch 120, a fitness tracker 130, intelligent voice assistants 150-1 to 150-$n$, personal computers from 160-1, . . . 160-$n$, smartphones from 170-1 to 170-$n$, servers from 180-1, . . . 180-$n$.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to communicate with the private network system to enable receipt and execution of speech commands translated to device specific SDK/API commands.

The devices can host one or more applications that receive data for collaboration. The data, information or content flow is always encapsulated using secure objects through the private network. The application automatically incorporates data received from different users. The application operates in a de-centralized manner. Only the originator has control to revise, modify or delete his or her own content. For example, if user A started a conversation that includes user B on the trusted list. User B can then post comments that user A does not like irrespective of whether user A agrees with it or not. User A cannot dictate or control the comments from others once he opens up the application for collaboration. Updates to the application are broadcast automatically to the recipients.

The role of the computing device manufacturers is separated from the use of the computing devices in hosting applications. After purchase, a user of the computing device has control on how to use, configure and communicate using that device. Use of any central services including those from the device manufacturer become optional. In one embodiment, there are one or more aliases associated with each of the computing devices including the IoT devices. The IoT devices integrate with the private network with zero additional programming. Different categories of smart watches 120, fitness trackers 130, personal computers 160 are connected securely and with encryption. The Intelligent voice assistants 150 can be from a variety of providers like Amazon Alexa, Google Home Assistant, Apple HomePod, Microsoft Cortana etc. Smartphones 170 and servers 180 with more computing power, bandwidth and capabilities are also connected. For example, the smallest computing device, i.e. an IoT doorbell ring to the largest computing device, a full-fledged server, are both treated equal in the digital private network world.

A person of ordinary skill in the art would appreciate that by encapsulating information or data in objects that follow default rules that are then incorporated into an application, the private network operates freely without a fear of malicious attacks or abuse related to misuse. An originator can create content that he or she desires to make public and distribute freely. An originator can then customize the rules for the object holding the content accordingly. The originator retains control to change his or her mind and totally delete or erase such content from all of its recipients.

Computing devices irrespective of their size, category or applications have powerful computing capabilities in terms of processing power and also have network bandwidth to connect. The systems and methods of modeling private network allow for these computing devices to connect seamless in a secure and encrypted manner after authentication. Each transaction is an authenticated exchange. Such exchanges eliminate spam. An unwanted sender is revoked from the whitelist of authenticated senders and cannot send spam.

A person of ordinary skill in the art would appreciate that two aliases communicating with each other have equal rights and access. Both the aliases require permission with each other to enter into a relationship and start a conversation through a secure channel. Either one of the alias can decide to terminate the relationship and revoke the established trust. These exchanges mirror the scenarios of communication in real life.

Private Network 140 can be different wireless and wired networks available to connect different computer devices including client and server systems. In an implementation, private network 140 is publicly accessible on the internet through secure messaging protocol described herein. In an implementation, private network 140 is inside a secure corporate wide area network. In an implementation, private network 140 allows connectivity of different systems and devices using a computer-readable medium.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, RSA, Advanced Encryption Standard (AES) or other methods known in the industry.

Figure 2:
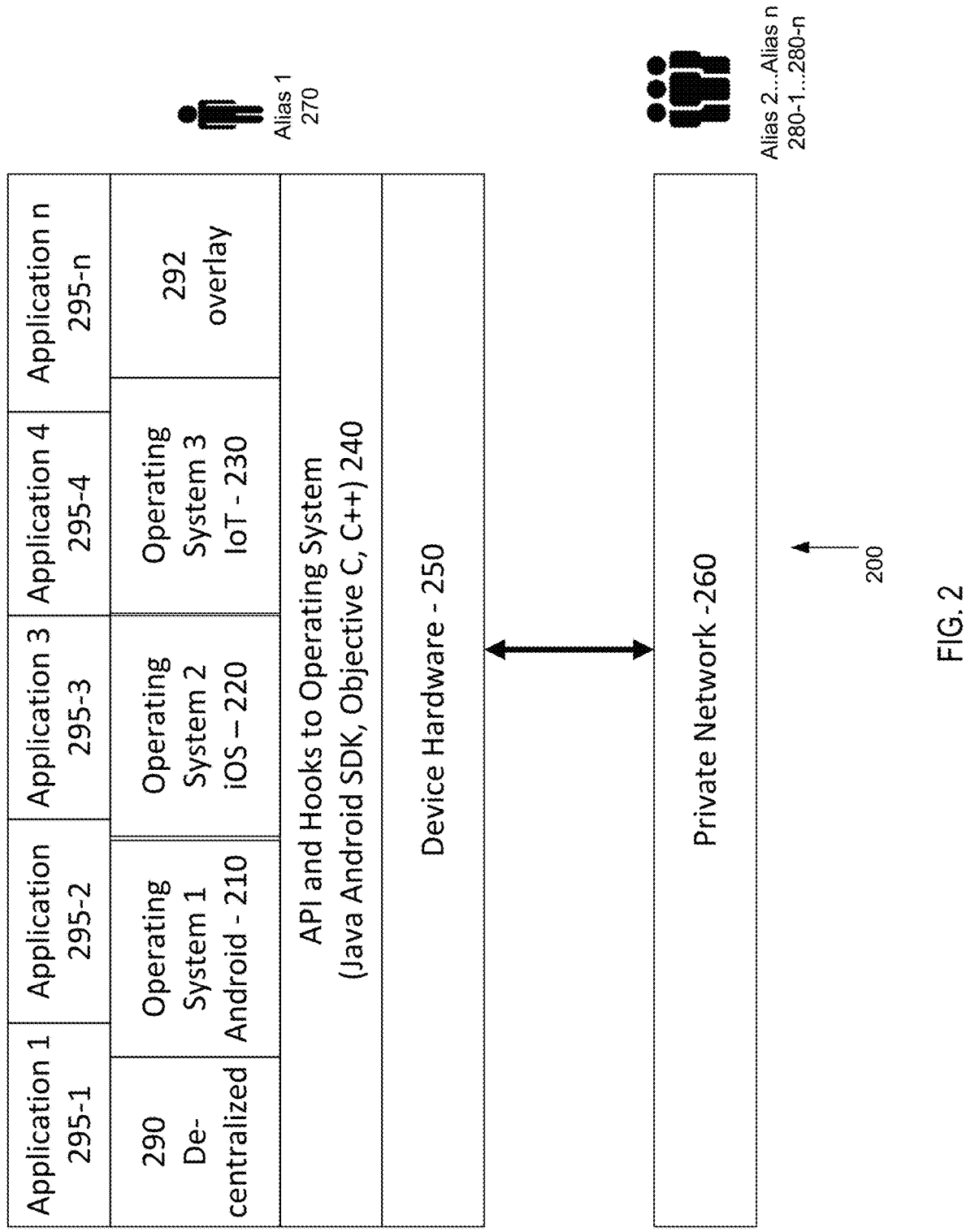
FIG. 2 shows an exploded view of a computing device with overlay network, according to one embodiment.

FIG. 2 is an exploded view 200 of different versions of an implementation that allow application programming interface, hooks, or overlay network connections in a computing device that hosts different applications. For example, Alias-1 270 is associated with a computing device that may have one or more operating systems including Android 210, iOS 220 or IoT operating system 230. The computing device includes device hardware 250 that can be controlled by the private network API/hooks 240 that are incorporated at a system level on the computing device. In one embodiment, depending on the computing device platform the private network overlay hooks are implemented using Java Android SDK, Objective C, or C++. In one embodiment, any and all communications are controlled using the private network overlay architecture that encompasses the operating system at 290 de-centralization module and 292 overlay network module. In one embodiment, a user can customize the alias to go in and out of the private network overlay architecture mode. The private network 260 includes other trusted alias 2 to alias n i.e. 280-1 to 280-n all of which can communicate with Alias-1 using authenticated, secure and encrypted channels. In one embodiment, the overlay network is based on peer to peer network. In one embodiment, the private network using an overlay network using the existing public network.

In one embodiment, the computing device includes application 1, 295-1, application 2 295-2, . . . application n 295-n from the private network. A person of ordinary skill in the art would understand that information of or related to the private networks exists only within secure objects that interact securely with the different applications. A computing device may host one or more applications that are directly connected to receive collaborative data from the private network. Even when Alias-1 is hosting the application, the application complies with de-centralized rules and policies from the private network. Comments and collaborative data is automatically uploaded and everyone is notified automatically. This allows for a non-censored communication. Only the originator has control to revise, modify or delete his data.

Figure 3:
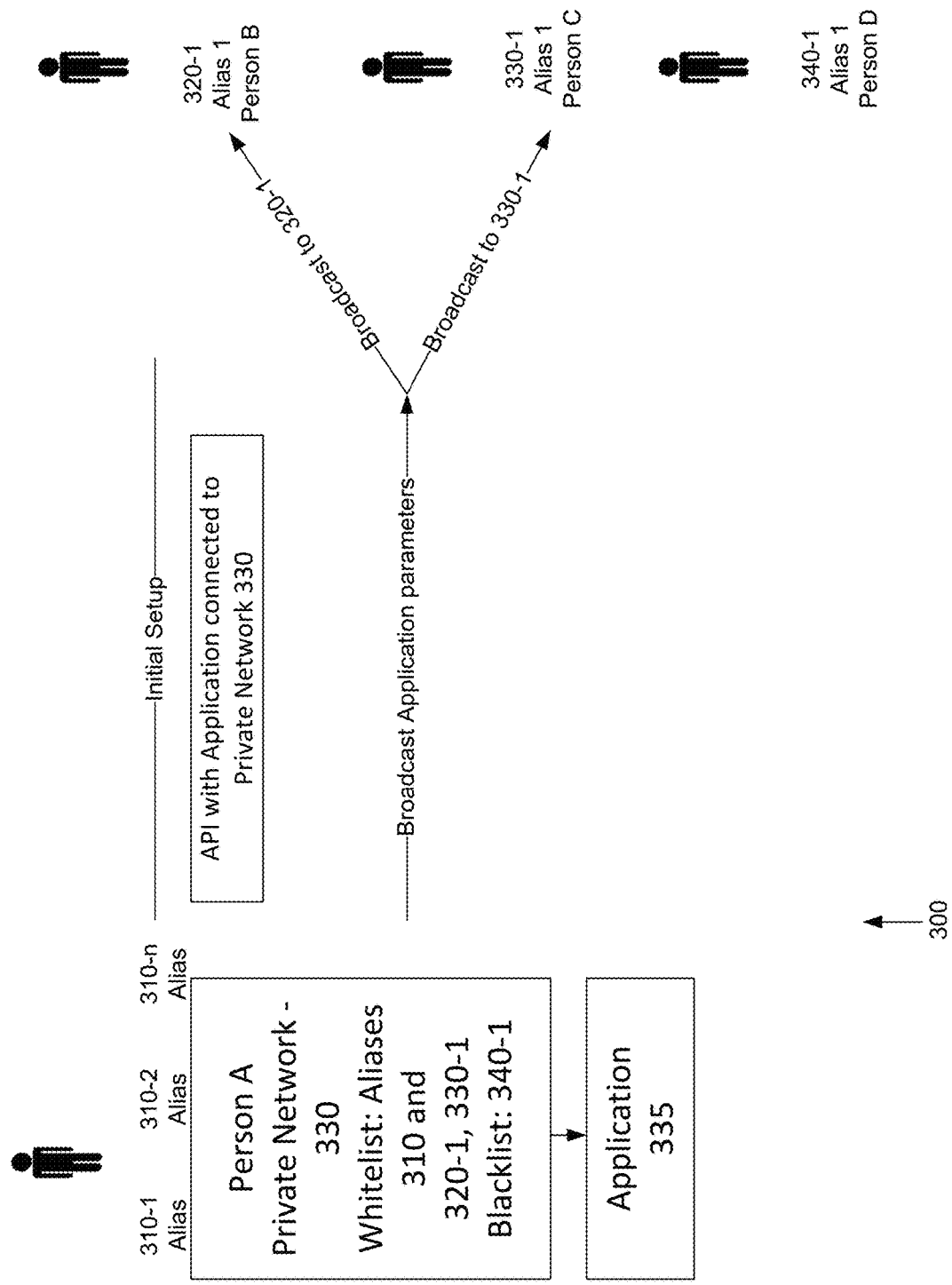
FIG. 3 is an exploded view of initial setup and broadcast, according to one embodiment.

FIG. 3 outlines 300 the initial setup and broadcast to host an application after trusted relationships between two or more aliases is already established. Aliases 310-1, 310-2, . . . 310-n belong to user 310 who owns one or more computing devices. Private network 330 access is controlled by user 310 using his whitelist that includes all of 310 Aliases, Alias 320-1 and Alias 330-1. Alias 340-1 is on the blacklist. All other devices not included are blacklisted by default. Alias 310-1 wants to host a collaborative application 335. He enables the collaborative application 335 to directly receive and transmit messages on the private network 330 using an automated application programming interface.

At 330, Alias 310-1 performs an initial setup check, selects initial conversation topic including any content that is to be used by application 335 on the private network 330. Once the initial setup is established, the 310-1 Alias broadcasts the availability of application 335 on the whitelist. The broadcast application includes parameters of collaboration. For example, in one broadcast related to a sale of an item, the broadcast parameters may include receipt of purchase price with a minimum amount needed. In another example, the broadcast parameter may put a time-based expiry on openness to receive data. In another example, the broadcast parameter may include a geographic proximity restriction to allow users to post data.

The broadcast is sent to all members of the whitelist, i.e. alias 320-1 and 330-1. Alias 340-1 on the blacklist does not receive the broadcast. The broadcast is secure and encrypted message. At the receiver, the message can be authenticated for sender because the original message is encrypted using alias private key. The message is also verified and validates with digital signature to ensure that it is not changed in transmission.

Figure 4:
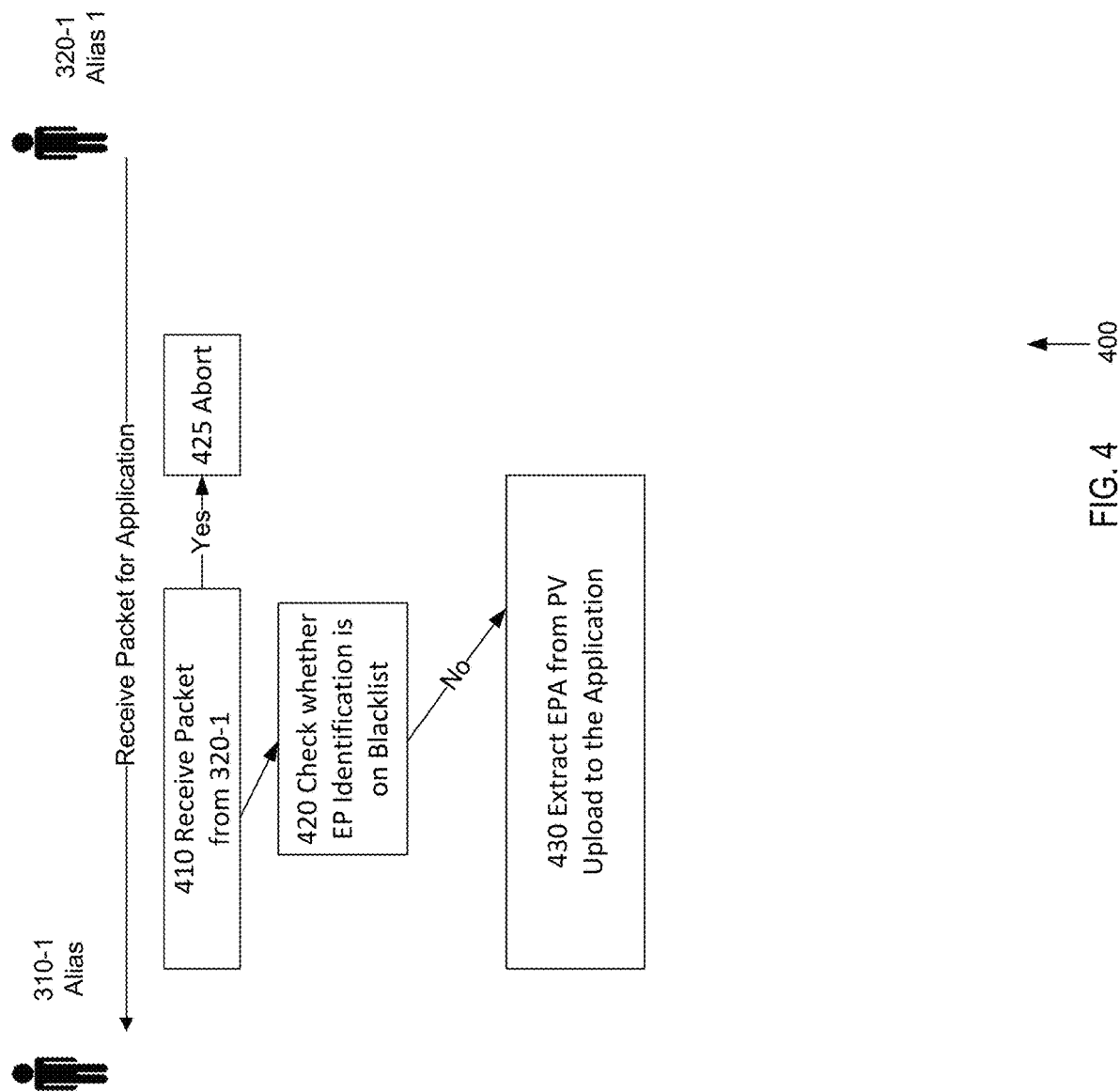
FIG. 4 is an exploded view of receiving content for an application, according to one embodiment.

FIG. 4 with 400 shows receipt of a packet for the application that follows FIG. 3. Alias 310-1 has now sent a packet to Alias 320-1. The packet includes information in response to the initial message sent by Alias 310-1. An initial check 410 is done to determine whether the packet sender is on blacklist. If he is already on a blacklist 425, i.e. if he is listed on blacklist explicitly and not on blacklist by default of not being on the whitelist, then the packet is aborted and no response is sent back. If he is not listed on the blacklist 420, the packet is decrypted after authentication and digital signature verification. At 430, the payload, i.e. application data is extracted with a Temporal Key.

The extracted payload can then be handed on to the collaborative application layer for further processing. For example, the payload could be part of a document that is processed using a document editor, a video, a song, a text or multimedia messaging application. A person of ordinary skill in the art would appreciate that the security provided by the collaborative application framework on the private network operates irrespective of the type of content that is exchanged.

Figure 5:
FIG. 5 is an exploded view of broadcasting updates to an application, according to one embodiment.

FIG. 5 with 500 shows the final stage of the application update notifications that follows FIG. 4. At Alias 310-1, the application automatically incorporates the payload from the packet that was received earlier. After the application update, the application realizes that the updated status is to be notified to all of the recipients on the whitelist. Alias 310-1 then sends a broadcast notification related to the application content update 510. The broadcast message is sent to Alias 320-1 and Alias 330-1. Alias 340-1 remains unaware of the communications related to application 335. A person or ordinary skill in the art would appreciate that such messages would continue in a de-centralized manner leading to a truly open collaborative environment.

Each broadcast message is secure and encrypted using a temporal key. This ensures that security is not compromised at any point. Anonymous, malicious or spam type messages are eliminated.

The application may now include higher level application protocols, including, for example, using Hyper-Text Transport Protocol ("HTTP"), Hyper-Text Transport Protocol Secure ("HTTPS") or Message Queuing Telemetry Transport ("MQTT") protocols. The device communication is encrypted using overlay Transport commands that include Transport control protocol ("TCP"), Web Sockets, MATT or Constrained Application Protocol ("CoAP").

Figure 6:
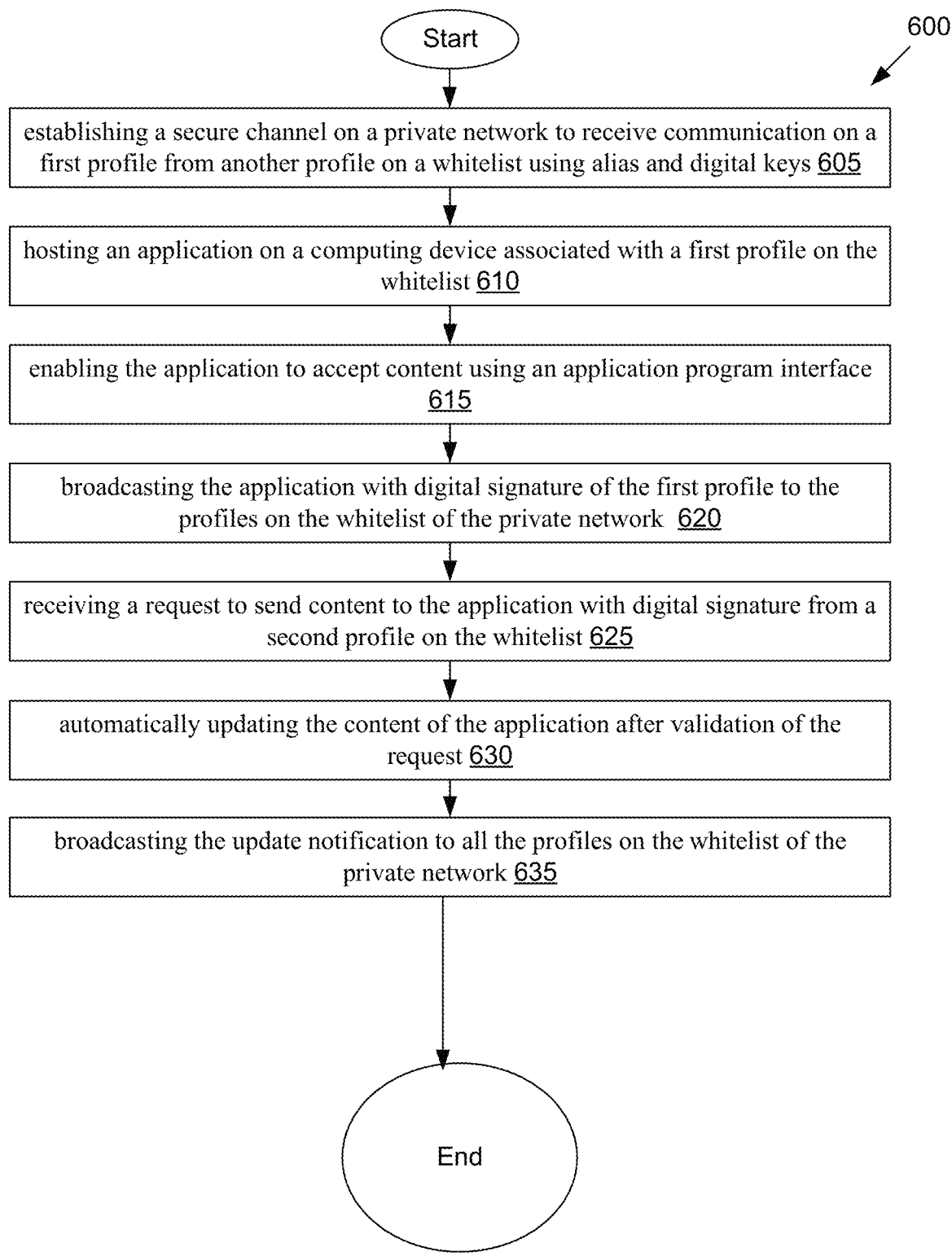
FIG. 6 shows a flowchart illustrating an example of a method of enabling a collaborative application on a private network.

FIG. 6 depicts a flowchart 600 illustrating an example of a method for collaborative application on a private network. The flowchart 600 is discussed in conjunction with the environment shown in the diagram 100 in FIG. 1. At block 605, begins with establishing a secure channel on a private network to receive communication on a first profile from another profile on a whitelist using alias and digital keys. At block 610, hosting an application on a computing device associated with a first profile on the whitelist. At block 615, enabling the application to accept content using an application program interface. At block 620, broadcasting the application with digital signature of the first profile to the profiles on the whitelist of the private network. At block 625, receiving a request to send content to the application with digital signature from a second profile on the whitelist. At block 630, automatically updating the content of the application after validation of the request. At block 635, broadcasting the update notification to all the profiles on the whitelist of the private network. A person of ordinary skill in the art would appreciate that the computing device triggers use of the application programming interface that allows a de-centralized and equal access to the application to all the users or profiles on the whitelist.

In one embodiment, the application is one or more of the following: a webserver, a webserver linking to a webpage external to the private network, a webserver with transcluded information from a webpage external to the private network, a plug-in installed on a browser, a mobile application, an ftp server, a document repository, database, an email server, or a social media blog.

In one embodiment, the application accepts comments as content on a published source that are dynamically annotated digitally on the source or in a side panel. In one embodiment, the broadcasting the update notification to the profiles on the whitelist is based on selective preferences of one or more of the following: time-based frequency, geographic proximity, source of an update.

In one embodiment, the source or originator profile computing device hosting the application has control to delete, modify or revise the application or any of the received content from all the devices on the private network. In one embodiment, the private network accepts requests from the second profile Alias 320-1 computing device to delete, modify or revise the content sent to the first profile Alias 310-1 by itself, i.e. by Alias 3204, from all the devices on the private network; and rejects requests to delete, modify or revise the application or content sent by another profile, i.e. Alias 330-1.

In a broad embodiment, the invention is systems and methods of enabling a collaborative application on a private network allow providing a de-centralized collaborative application that automatically updates data and sends notifications to all users collaborating after each update based on selective preferences and type of application data. There is no scope for censorship in the use of the collaborative application.

Figure 7:
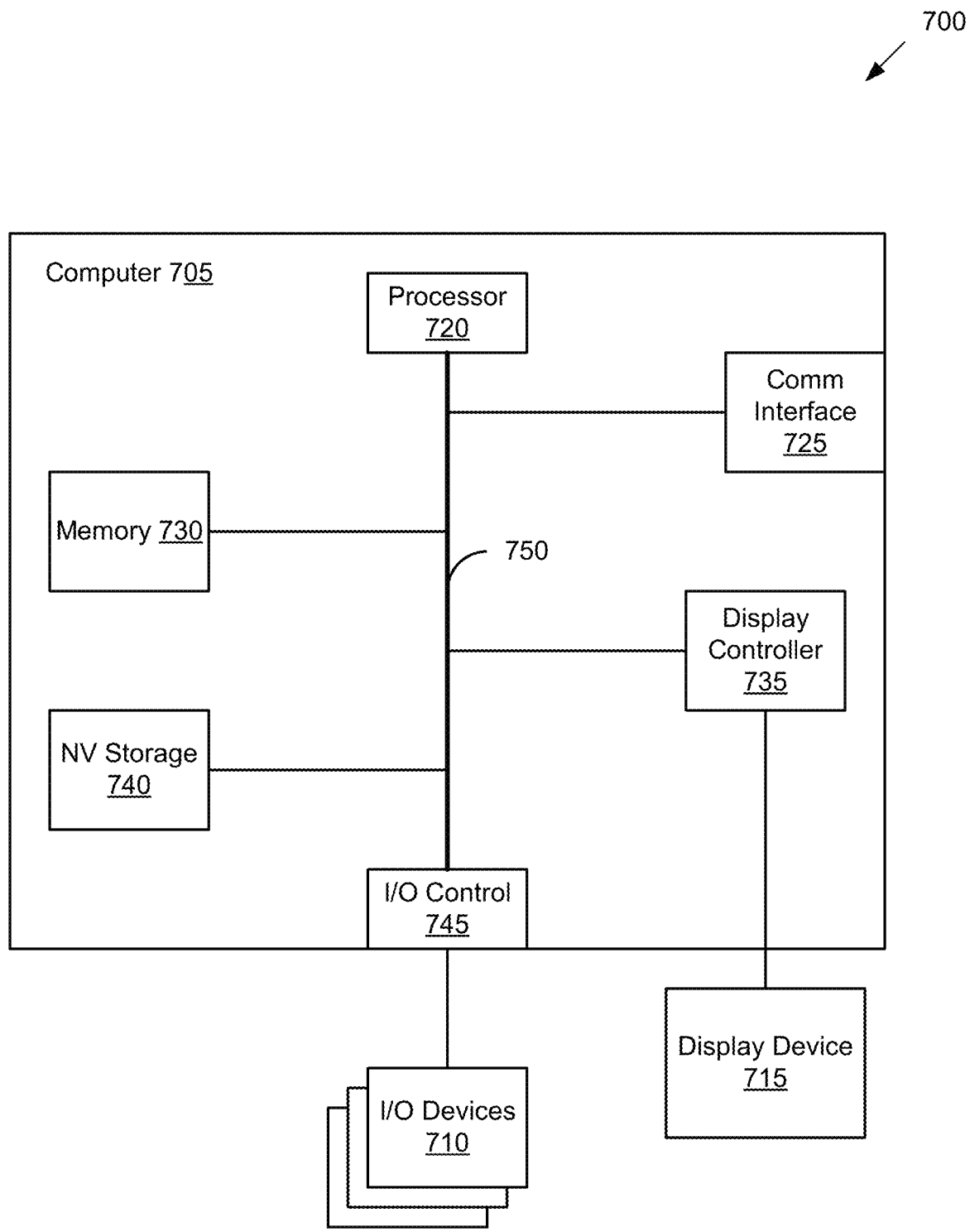
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 8:
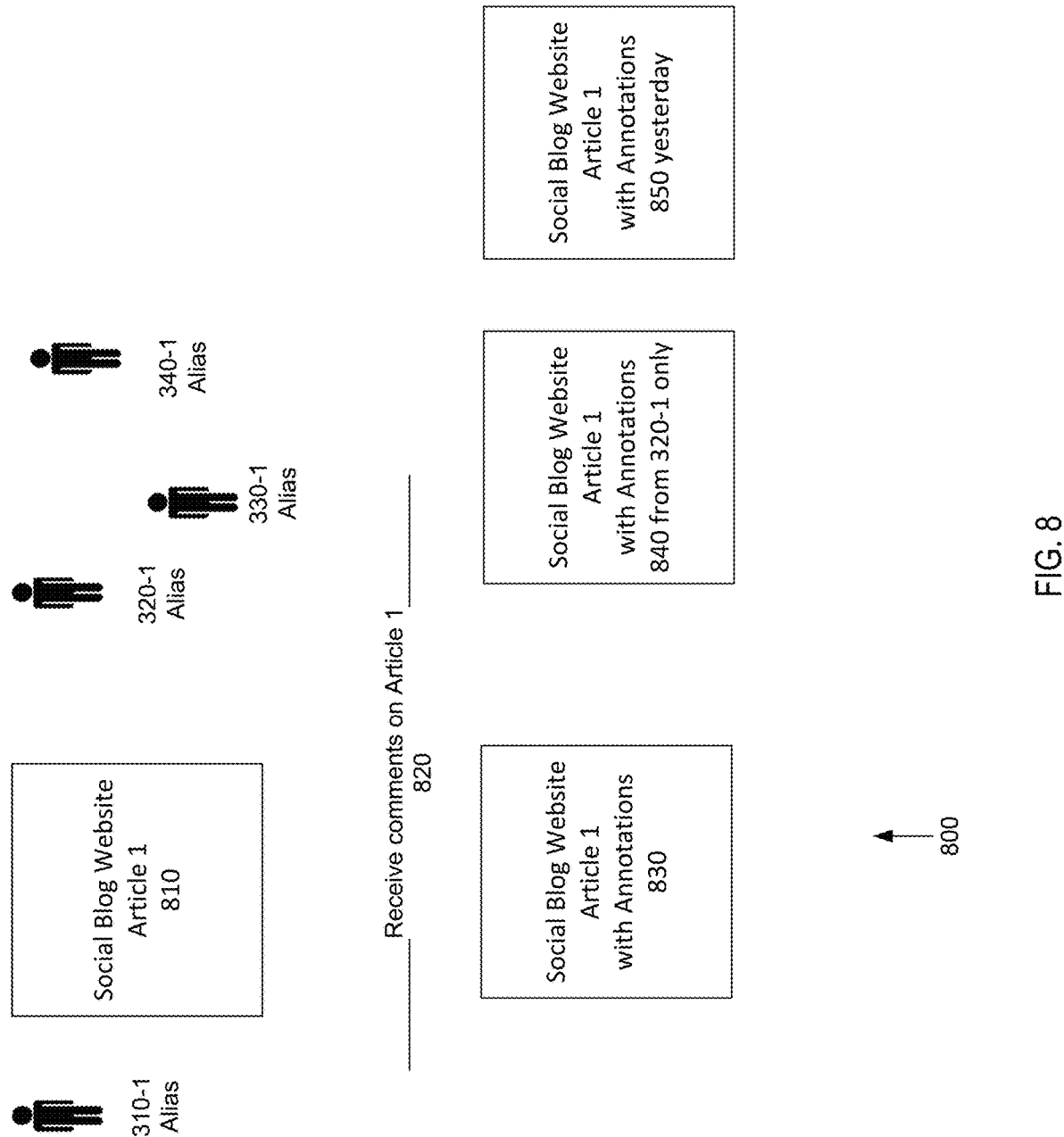
FIG. 8 is a staged level diagram illustrating different types of publications of content from an application.

FIG. 8 shows different stages with regards to data posted on an application. To begin with a private network with Alias 310-1 includes a social blog website with Article 1 at 810. An initial key and setup stage is used to automate the publishing of Article 1 at 810 as described earlier. In one embodiment, Alias 320-1, 330-1, and 340-1 all have equal access and control to collaborate with comments on Article 1. Once Alias 310-1 decides to publish and make it available to the aliases on the whitelist, he cannot control or censor the comments received from that group.

At 820, Alias 310-1 application receives comments that are automatically published on the social blog. The private network can reproduce different versions of Article 1 depending on the received comments and annotations. For example, one version 830 is a published Article 1 is original content plus all comments received up to that time. Another version 840 is published Article 1 is original content plus all comments received from Alias 320-1 only. Another version 850 is published Article 1 with all comments received up to a time stamp i.e. yesterday.

Rendering of the published content may be based on user preferences. For example, Alias 320-1 may prefer comments from everyone to be in yellow and from one particular alias to be in red. Another Alias may request the same version of the article in black and white. The private network allows customized graphical user interfaces per receiver depending on preferences at the destination computing device. In one embodiment, the rendering of the published content is based on default user interface settings at the computing device.

In one embodiment, the whitelists for the application are based on profiles that are added for permanent access, transient based on geographic proximity, transient based on a time period, or transient based on the type of the application. For example, a host of a concert may allow transient relationships based on geographic proximity to a snack shop allowing users to buy and pay for snacks online at that time with faster access to avoid long lines.

In one embodiment, the application can revert back to the application state for one or more profiles based on one or more of the following: a given time snapshot, exclusively for updates from a source, selectively displaying or hiding portions of updates based on profile preference. For example, an originator of comments can later change his or her mind and decide to delete all of his comments. The application state will then revert back to time snapshot without his comments. A person of ordinary skill in the art would appreciate that the application upload is automated and complied through the private network. This allows for free association without fear of censorship, removes anonymous content posting and prevents spam on the social blog website and in the associated private network.

Figure 9:
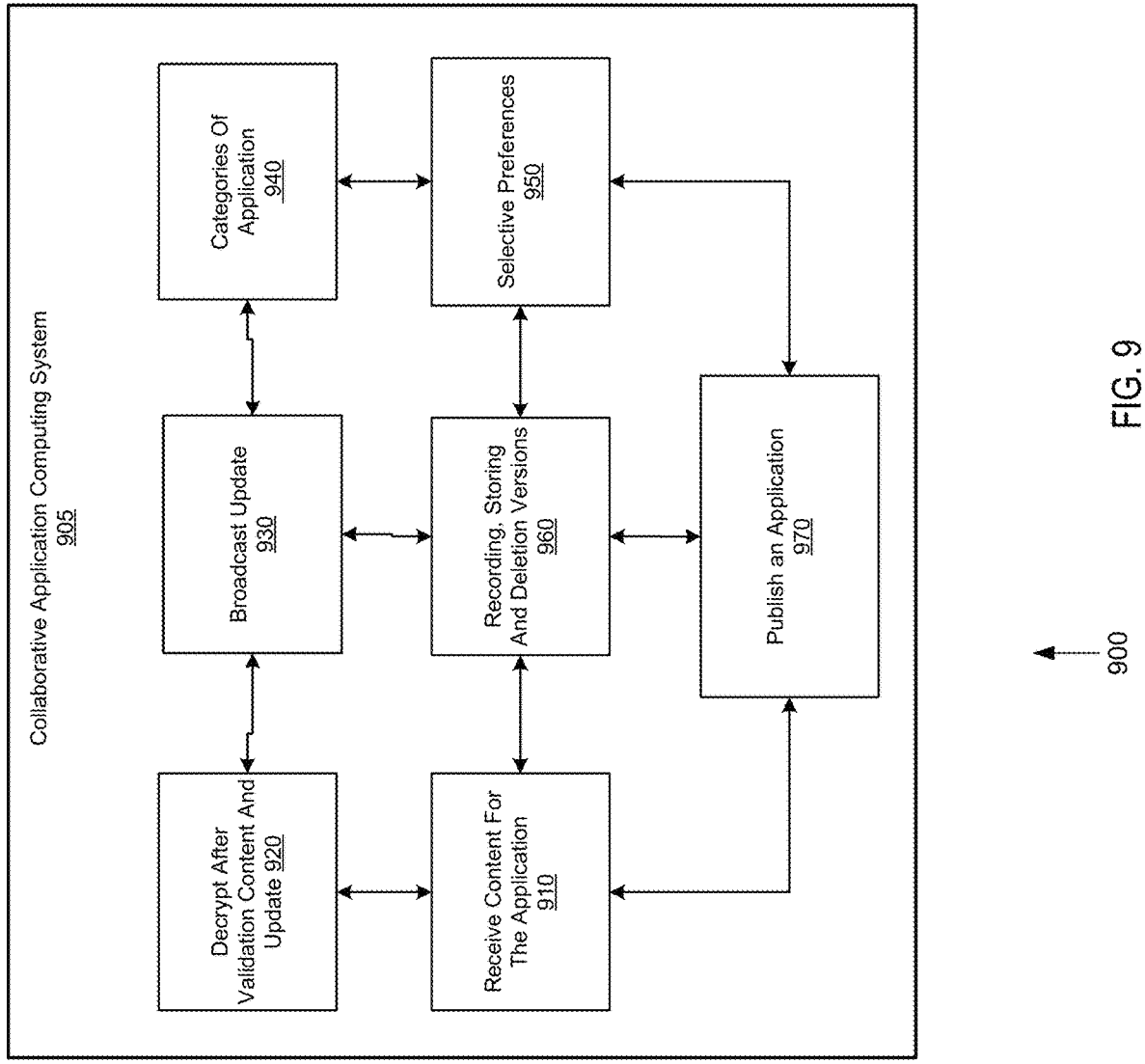
FIG. 9 is an exploded view of collaborative application computing device with different subroutines according to one embodiment.

FIG. 9 shows an exploded view of a collaborative application 905 on a computing device according to one embodiment of the proposed solution. Module 970 is used to publish a collaborative application. The application is setup to automatically receive content and messages from the private network. All communications are secure and encrypted communications that are received from senders on a whitelist for the private network. All communications from entities not on whitelist or explicitly residing on a blacklist are discarded and further steps are aborted. Module 910 receives content for the application from a sender on the whitelist. After an initial check as to sender and verification of digital signature the packet information is moved to other modules for further processing. Module 920 decrypts the secure packets after validation of content and uploads to the application. Different applications receive the payload information from the decrypted packets. Checks are also performed as to whether a response or notification broadcast is needed or not. Module 930 broadcasts the received update. Notification packets are encrypted with private key for authentication and include hash of digital signatures to verify that the packet is not corrupt during transmission. Module 940 manages categories of applications. Different applications depending on their type have different needs. For example, a live streaming application may have more intensive notification needs than an offline application that is updated at a slower pace. Module 950 manages selective preferences for the receivers. The rendering or publication of the original content and subsequent updates are customized per recipient preferences. For example, alias 320-1 may decide to mute comments from alias 330-1 selectively or mute all notifications for a given content that he does not find interesting. As discussed earlier, preferences could be based on graphical user interface preferences as well. Module 960 is used for recording, storing and deleting versions of the content based on controlling commands from the source or originator. Data is always encapsulated within secure objects using temporal keys that comply with valid commands from authorized profiles. In one embodiment, the private network archives portions of or all of the application and associated content based on time snapshots.

In one embodiment, collaborative application on a private network is implemented using a blockchain platform. The blockchain platform provides different services that are modular, customized and flexible for a given set of users. For example, the blockchain platform provides modular services for authentication, encryption, different applications etc. The private network supporting securing digital conversations for its life cycle can pick and choose to modularly work with a blockchain platform to provide additional features and services to its aliases and the end-users. A person of ordinary skill in the art would understand that collaborative application on a private network can be implemented at personal level as well as for an enterprise.

A person of ordinary skill in the art would appreciate that collaborating through application on the private network changes the perspective and use of communicating, freely associating and use of internet. An end-user i.e. owner of a computing device with the use of smart and intelligent aliases has full control on how to associate and communicate with different users.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of enabling a collaborative application on a private network, comprising:
    establishing a secure and encrypted private network with a whitelist of two or more profiles using alias and digital keys; hosting an application on a computing device associated with a first profile on the whitelist;
    enabling the application to accept content using an application program interface,
    broadcasting the application with digital signature of the first profile to the profiles on the whitelist of the private network; receiving a request to send content to the application with digital signature from a second profile on the whitelist;
    automatically updating the content of the application after validation of the request;
    broadcasting an update notification to all the profiles on the whitelist of the private network based on selective preferences of one or more of the following: time-based frequency, geographic proximity, source of an update;
    wherein the first profile computing device hosting the application has control to delete, modify or revise the application or any of the received content from all the devices on the private network.

2. The method of claim 1, wherein the application is one or more of the following: a webserver, a webserver linking to a webpage external to the private network, a webserver with transcluded information from a webpage external to the private network, a plug-in installed on a browser, a mobile application, an ftp server, a document repository, database, an email server, or a social media blog.

3. The method of claim 1, wherein the application accepts comments as content on a published source that are dynamically annotated digitally on the source or in a side panel.

4. The method of claim 1, wherein private network accepts requests from the second profile computing device to delete, modify or revise the content sent to the first profile by itself from all the devices on the private network; and rejects requests to delete, modify or revise the application or content sent by another profile.

5. The method of claim 1, further comprising:
    preventing censorship, anonymous content or spam on the private network.

6. The method of claim 1, further comprising:
    archiving portions of or all of the application and associated content based on time snapshots.

7. The method of claim 1, further comprising:
    reverting back to the application state for one or more profiles based on one or more of the following: a given time snapshot, exclusively for updates from a source, selectively displaying or hiding portions of updates based on profile preference.

8. The method of claim 1, further comprising:
    adding profiles on the whitelist for permanent access, transient based on geographic proximity, transient based on a time period, or transient based on the type of the application.

9. A system of enabling a collaborative application on a private network, comprising:
    a secure and encrypted private network with a whitelist of two or more profiles using alias and digital keys;
    a first profile computing device on the whitelist configured to:
        host an application;
        enable the application to accept content using an application program interface;
        broadcast the application with digital signature of the first profile to the profiles on the whitelist of the private network;
        receive a request to send content to the application with digital signature from a second profile on the whitelist; automatically update the content of the application after validation of the request;
        broadcast an update notification to all the profiles on the whitelist of the private network based on selective preferences of one or more of the following: time-based frequency, geographic proximity, source of an update;
    wherein the first profile computing device hosting the application has control to delete, modify or revise the application or any of the received content from all the devices on the private network.

10. The system of claim 9, wherein the application is one or more of the following: a webserver, a webserver linking to a webpage external to the private network, a webserver with transcluded information from a webpage external to the private network, a plug-in installed on a browser, a mobile application, an ftp server, a document repository, database, an email server, or a social media blog.

11. The system of claim 9, wherein the application accepts comments as content on a published source that are dynamically annotated digitally on the source or in a side panel.

12. The system of claim 9, wherein the private network accepts requests from the second profile computing device to delete, modify or revise the content sent to the first profile by itself from all the devices on the private network; and rejects requests to delete, modify or revise the application or content sent by another profile.

13. The system of claim 9, wherein the private network is further configured to:
    prevent censorship, anonymous content or spam on the private network.

14. The system of claim 9, wherein the private network is further configured to:
    archive portions of or all of the application and associated content based on time snapshots.

15. The system of claim 9, wherein the private network is further configured to:
    revert back to the application state for one or more profiles based on one or more of the following: a given time snapshot, exclusively for updates from a source, selectively displaying or hiding portions of updates based on profile preference.

16. The system of claim 9, wherein the private network is further configured to:
    add profiles on the whitelist for permanent access, transient based on geographic proximity, transient based on a time period, or transient based on the type of the application.

* * * * *